March 26, 1963                 H. GRUEN                 3,082,981
AIRPLANE CONSTRUCTION EMBODYING REDUCED AERODYNAMIC
DRAG AND ISOLATED FUEL COMPARTMENTS
Filed Aug. 25, 1961
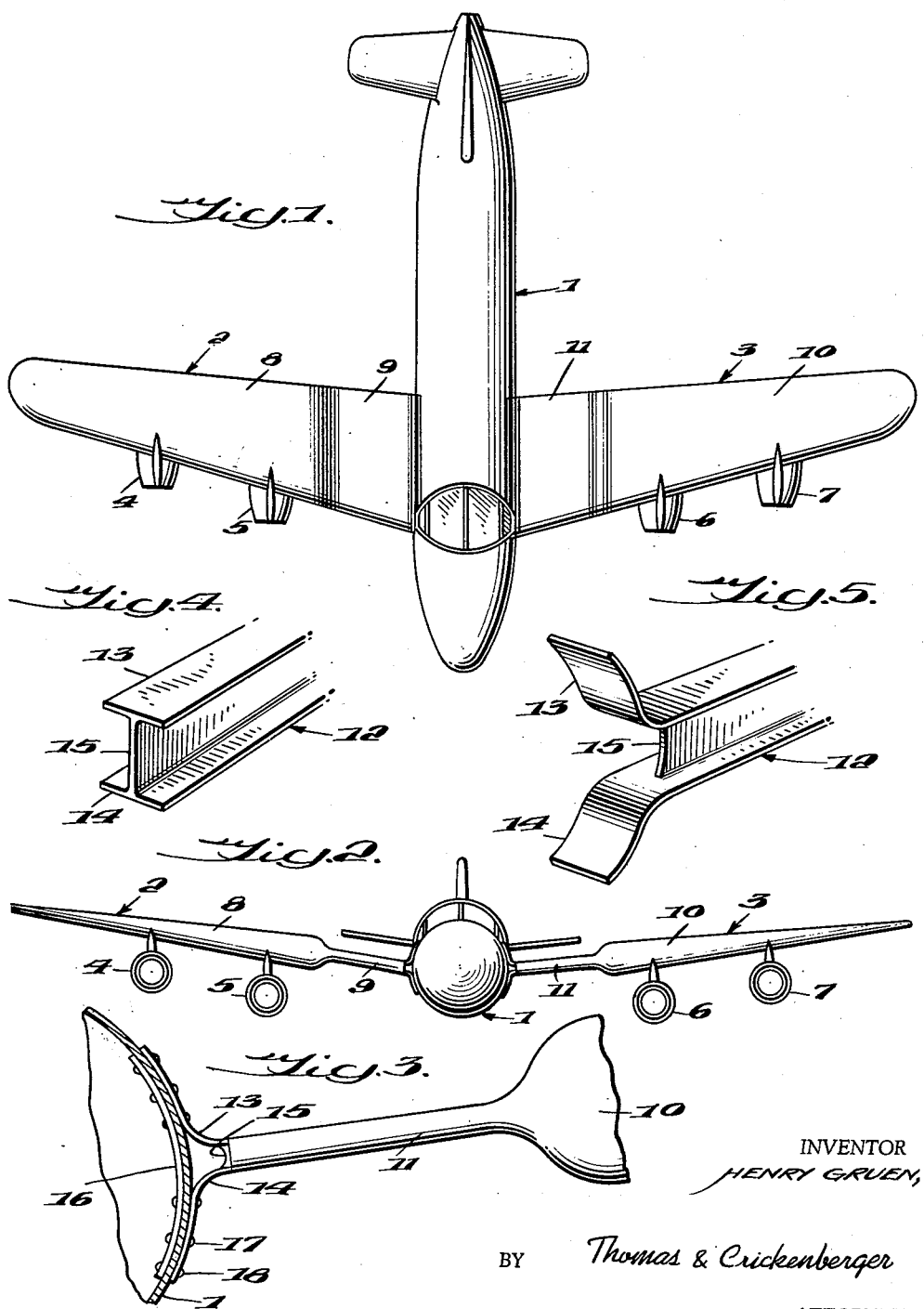
INVENTOR
HENRY GRUEN,
BY Thomas & Crickenberger
ATTORNEYS United States Patent Office 3,082,981
Patented Mar. 26, 1963

3,082,981
AIRPLANE CONSTRUCTION EMBODYING REDUCED AERODYNAMIC DRAG AND ISOLATED FUEL COMPARTMENTS
Henry Gruen, 1621 Hobart St. NW., Washington 9, D.C.
Filed Aug. 25, 1961, Ser. No. 133,817
1 Claim. (Cl. 244—130)

This invention relates to a novel airplane construction, and more particularly to an airplane construction in which the aerodynamic resistance of the wings is reduced to a material extent while providing for the isolation of the fuel compartments from the passenger area.

It is a well recognized principle that the air resistance encountered by a flying object impedes the forward progress of the object as well as providing the necessary lifting force to sustain the flight of the object. An ideal result, which is impossible of achievement, would be to eliminate all resistance to forward motion and yet retain the lifting power provided by such resistance. Modern airplanes are faired, or streamlined, to reduce the air resistance and turbulence caused by the movement of the plane through the air. Aerodynamic wind tunnels are helpful in determining the proper shapes for the corresponding least air resistance.

A problem facing the aeronautical engineers in effecting the streamlining is that of providing storage space for the fuel of the aircraft, and the hollow portions of the wings of the aircraft are generally utilized for this purpose. It has been customary in providing enlarged storage spaces for the aircraft fuel to make the wing root, which is the base portion of the wing where it joins the fuselage, of substantial thickness. The thickness of this wing root produces excessive turbulence of the air while the aircraft is in motion and impedes the forward progress of the plane to a substantial extent. A feature of the present invention is the minimization of this turbulence and reduction in the aerodynamic drag produced by the wing root to yield increases in speed and lowered fuel consumption.

The storage of the aircraft fuel in the wing sections has generally resulted in the fuel tanks being located immediately adjacent the fuselage of the plane and next to the passengers. It will be appreciated from the proximity of the fuel that a real danger exists in case of fire or explosion. Ideally the fuel should be located as far as possible from the passenger area. It is a further feature of this invention to provide fuel storage space which is located other than at a point immediately adjacent the passenger area.

A still further feature of the present invention is a method of attaching the wing root portion to the fuselage which greatly enhances the strength of the structure and insures that the wing is firmly attached at all times.

The features of the present invention are realized in a wing construction in which the wing root thickness is reduced to the point of being only as thick as the structural members employed. Conventional I beams, whose ends at the wing root are flanged apart with the web removed, are utilized as the structural members. The divergent or flanged apart ends of the I beam are attached to the fuselage by means of an interiorly located backing or support plate to provide a strong reliable structure. The main body portion and tip of the wings are utilized as the fuel storage area, thereby separating the fuel needed from the passengers.

The foregoing and other objects, features and advantages of the invention will be apparent from the following more particular description of a preferred embodiment of the invention as illustrated in the accompanying drawings in which:

FIGURE 1 is a top view of an airplane constructed in accordance with the principles of the present invention;
FIGURE 2 is a front view of the airplane;
FIGURE 3 is a detailed view showing the means of attaching the wing to the fuselage;
FIGURE 4 is a perspective view of a conventional I beam, and
FIGURE 5 is a perspective view of an I beam modified in accordance with the present invention to serve as a wing structural member.

The aircraft shown in FIGURES 1 and 2 of the drawings comprises a fuselage portion generally indicated by the numeral 1 and wing portions generally indicated by the numerals 2 and 3. Wing 2 carries engines 4 and 5 suspended therebeneath, and wing 3 carries engines 6 and 7 in similar positions.

Wing 2 is made up of section 8 with an enlarged thickness, and section 9, which is the wing root, is made up of a reduced thickness. Wing 3 is made up of section 10 having an enlarged thickness, and section 11 having a reduced thickness. It has been found that the thickness of sections 9 and 11 should be reduced to approximately one-fifth of the normal wing root thickness for best results. Sections 8 and 10 are hollow and carry the fuel tanks for the engines 4 through 7. While this arrangement allows less fuel to be carried than if the entire wing contained fuel storage space, the amount of fuel needed to carry the plane a given distance is no longer as great because of the reduced wing root thickness. Therefore, the plane can travel greater distances at increased speeds on lesser amounts of fuel and consequently the storage space requirement is not as great.

FIGURE 3 shows the manner in which the wing is attached to the fuselage of the aircraft. In order to accomplish this attachment the structural members, such as that shown in FIGURE 4, must be formed in a manner such as that shown in FIGURE 5.

A conventional I beam 12 comprising rails 13 and 14 interconnected by web portion 15 is modified by cutting away a portion of the web section 15 as shown in FIGURE 5. The rail members 13 and 14 are then bent into a divergent configuration so as to fit smoothly against the fuselage 1 of the airplane. A plurality of these I beams located in the plane of the wing member are included in each wing structure.

In FIGURE 3 the wing is shown as being attached to the fuselage 1 by means of rivets such as those shown at 17 and 18. While the fastening elements are shown as being rivets, it is to be understood that any conventional fastening elements can be used. A backing plate 16, located in the interior of the fuselage is used to provide additional support and strength for the wing structure. When the flanged elements 13 and 14 are secured to the backing plate 16 through the fuselage 1, a secure structure is accomplished which is capable of withstanding the tremendous forces required in flight.

While the invention has been shown and described with particular reference to a preferred embodiment, it will be understood by those skilled in the art that various changes in form and details may be made without departing from the spirit and scope of the invention.

What is claimed is:

In an airplane structure the combination with a fuselage of wings, each of said wings comprising an outer section of enlarged thickness and an inner section of reduced thickness, said inner sections including I beam members whose height is the same as the thickness of said inner sections, means to fasten said wings to said fuselage, said means including divergent portions integral with said I beam members shaped to fit against the outer surface of said fuselage and support members of configurations complementary to said fuselage located within said fuselage and fastened to said divergent portions of said I beam members, and means within said outer sections of enlarged thickness for containing fuel, whereby the aerodynamic resistance of said wings is reduced and said fuselage is effectively isolated from the fuel thereby reducing the danger of fire to occupants of the fuselage in the event of a crash or explosion of fuel.

References Cited in the file of this patent

UNITED STATES PATENTS

| | | |
|---|---|---|
| 1,355,624 | Sharkey | Oct. 12, 1920 |
| 2,090,038 | Goddard | Aug. 17, 1937 |
| 2,689,698 | Agnew | Sept. 21, 1954 |
| 2,841,344 | Stroukoff | July 1, 1958 |

FOREIGN PATENTS

| | | |
|---|---|---|
| 387,719 | Great Britain | Feb. 13, 1933 |
| 1,045,810 | Germany | Dec. 4, 1958 |